United States Patent Office 3,798,280
Patented Mar. 19, 1974

3,798,280
PROCESS FOR PREPARATION OF
2,6-DIMETHYL NAPHTHALENE
Keizo Shimada, Takeo Nishikawa, Toshiaki Harada, Seizi Kurozumi, Yoshinobu Takeuchi, and Shizuo Nagahama, Tokyo, Japan, assignors to Teijin Limited, Osaka, Japan
Filed Jan. 24, 1972, Ser. No. 219,994
Claims priority, application Japan, Jan. 27, 1971, 46/2,734
Int. Cl. C07c 15/24
U.S. Cl. 260—668 F          5 Claims

ABSTRACT OF THE DISCLOSURE

In the preparation of 2,6-dimethyl naphthalene by feeding 1,5-dimethyl naphthalene, 1,6-dimethyl naphthalene, a mixture thereof, or a mixture containing such dimethyl naphthalene as the main component to the zone of an isomerization reaction, isomerizing the dimethyl naphthalene in the presence of an isomerization catalyst, cooling the resulting isomerization reaction product to crystallize 2,6-dimethyl naphethalene, and separating and recovering the same, the improvement wherein 2,7-dimethyl naphthalene or its eutectic mixture is removed before the mother liquor remaining after the recovery of 2,6-dimethyl naphthalene from the isomerization reaction product is recycled to the isomerization reaction zone.

---

This invention relates to a process for advantageously preparing 2,6-dimethyl naphthalene of high purity in improved yield industrially.

In the art a process has been well known for preparing 2,6-dimethyl naphthalene which comprises the steps of feeding 1,5-dimethyl naphthalene, 1,6-dimethyl naphthalene, 1,6-dimethyl naphthalene, a mixture thereof, or a mixture containing such dimethyl naphthalene as the main component to the zone of an isomerization reaction, isomerizing such dimethyl naphthalene in the presence of an isomerization catalyst, cooling the resulting isomerization reaction product to crystallize 2,6-dimethyl naphthalene, and separating and recovering the same.

In working the above process on an industrial scale, it is common to recycle the mother liquor from which the 2,6-dimethyl naphthalene has been separated, to the isomerization reaction zone. However, as such industrial operation is continued, the yield and purity of the resulting 2,6-dimethyl naphthalene are gradually reduced, though the reason for such reduction has been unknown.

2,6-dimethyl naphthalene is a useful compound which can be formed by known oxidation reactions into a valuable starting material for preparing polyesters useful in the preparation of synthetic fibers, films, resins, etc. Accordingly, the art has demanded a process capable of preparing 2,6-dimethyl naphthalene of high purity in good yield and with high reproducibility.

Under such circumstances, research has been conducted with a view to developing a process where the abovementioned undesired reduction of the yield and purity of the product 2,6-dimethyl naphthalene is not brought about, and it has been surprisingly found that in the above recycling isomerization reaction system, 2,7-dimethyl naphthalene and/or a eutectic mixture thereof is formed which causes the above-mentioned undesired reduction of the yield and purity of the 2,6-dimethyl naphthalene product.

It has been well known that dimethyl naphthalene (which will sometimes be referred to simply as "DMN" hereinbelow) includes various isomers, and the system of shifting of the methyl group includes, for instance, the following three types:

(1)   1,5-DMN⇌1,6-DMN⇌2,6-DMN 
(2)   1,8-DMN⇌1,7-DMN⇌2,7-DMN
(3)   1,4-DMN⇌1,3-DMN⇌2,3-DMN It has also been known that no shifting occurs between the system (1) and system (2) (see, for instance, J. Org. Chem., 29, 2939, 1964).

Surprisingly it has now been found that when the isomerization reaction is conducted by the abovementioned recycling operation with use of 1,5-dimethyl naphthalene and/or 1,6-dimethyl naphthalene which has been purified to the chemically pure product and is free of any of 1,7-, 1,8- and 2,7-dimethyl naphthalenes, 2,7-dimethyl naphthalene is formed in the isomerization reaction product, though details of the mechanism of formation of 2,7-dimethyl naphthalene have not been completely elucidated. It has also been found that the so formed 2,7-DMN is not isomerized to 2,6-DMN, as described above, but is accumulated in the recycling reaction system and causes the reduction of the yield and purity of 2,6-DMN. Further, it has been found that this 2,7-DMN formed as a by-product can be easily removed from the recycling reaction system by simple means and that the abovementioned disadvantages can be overcome by conducting this removal operation at any optional stage after the isomerization but prior to recycle of the mother liquor to the isomerization reaction zone.

Accordingly, the primary object of this invention to provide a process for preparing 2,6-dimethyl naphthalene according to which 2,6-dimethyl naphthalene of high purity can be obtained in high yield and with good reproducibility.

Other objects and advantages of this invention will be apparent from the description given herein below.

In the process of this invention, 2,7-dimethyl naphthalene formed as a by-product is removed from the recycling isomerization system in the form of its eutectic mixture, for instance, a eutectic mixture of 2,6-DMN and 2,7-DMN or a eutectic mixture of 2,6-DMN, 2,7-DMN and 1,5-DMN, at a stage after the isomerization reaction but prior to recycling of the mother liquor to the isomerization reaction zone. Accordingly, in the process of this invention starting charges to be added to the recycling isomerization reaction system are composed mainly of DMN isomers belonging to the shifting type of 1,5-DMN⇌1,6-DMN⇌2,6-DMN.

In the process of this invention especially good results are obtained by employing starting charges substantially free of DMN isomers of the shifting type of 1,7-DMN⇌1,8-DMN⇌2,7-DMN. 

Several embodiments of the removal of 2,7-dimethyl naphthalene according to this invention are illustrated in accompanying FIGS. 1 and 2.

In the embodiment illustrated in FIG. 1, the isomerization reaction product coming from isomerization reaction zone 1 is cooled in crystallization zone 2 which is maintained at a temperature at which both 2,6-DMN and a eutectic mixture of 2,7-DMN crystallize or at a temperature lower than such crystallizing temperature, preferably at a temperature lower by about 5° C. than such crystallizing temperature, whereby 2,6-DMN and the eutectic mixture of 2,7-DMN are allowed to crystallize. Then, the crystallized product is seprated from crystallization zone 2. Thus, the eutectic mixture of 2,7-DMN is removed from the recycling isomerization reaction system. The crystallized product is then forwarded to purification zone 3 where it is treated with an organic solvent which has a low dissolving property for 2,6-DMN but a high dissolving property for the eutectic mixture of 2,7-DMN. As a result, purified 2,6-DMN can be recovered. The mother liquor from which the purified 2,6-DMN has been separated is then condensed according to need and cooled in zone 4, and the crystallizing eutectic mixture of 2,7-DMN is removed from the mother liquor. Then the purification solvent is removed and the remaining crystallized product is recycled to the isomerization reaction zone.

In the embodiment illustrated in FIG. 1, distillation zone 5 is provided for distilling off mono- and tri-methyl naphthalenes. This zone is provided according to need in conducting the process of this invention. In the illustrated embodiment, this distillation zone 5 is provided in the recycle system prior to recycling of the mother liquor coming from the crystallization zone to the isomerization reaction zone. This distillation zone 5 may be provided, for instance, midway between zones 1 and 2. The distillation of mono- and tri-methyl naphthalenes formed as by-products may be conducted at any optional stage after the isomerization reaction but prior to recycle of the mother liquor to the isomerization recation zone.

Another embodiment of removal of 2,7-DMN in the form of its eutectic mixture from the recycling isomerization reaction system is illustrated in FIG. 2.

In the embodiment illustrated in FIG. 2, the reaction product from isomerization reaction zone 1 is cooled in crystallization zone 2 at a temperature at which 2,6-DMN begins to crystallize or at a temperature lower than such temperature but higher than the temperature at which the eutectic mixture of 2,7-DMN is allowed to crystallize. The crystallized 2,6-DMN is separated and purified in purification zone 3 in the same manner as described with respect to the embodiment illustrated in FIG. 1. The mother liquor coming from crystallization zone 2 is forwarded to a second crystallization zone 2' where it is further cooled at a temperature at which the eutectic mixture of 2,7-DMN present in the mother liquor dissolved therein is allowed to crystallize substantially or at a temperature lower than such temperature (of course, at a temperature higher than the temperature at which the entire mother liquor freezes). The crystallized eutectic mixture is removed from the recycle system. The mother liquor is then recycled to isomerization reaction zone 1 as in the embodiment illustrated in FIG. 1.

As explained in the embodiment illustrated in FIG. 1, the distillation of mono- and tri-methyl naphthalenes can also be performed in the embodiment illustrated in FIG. 2. In the embodiment illustrate in FIG. 2, the mother liquor in purification zone 3 is substantially free of the eutectic mixture of 2,7-DMN, and therefore, it is possible to recycle crystallized products remaining after removal of the purification solvent from such mother liquor, directly to the isomerization reaction zone.

Organic solvents which have a low dissolving property for 2,6-DMN but can dissolve substantial amounts of eutectic mixtures of 2,7-DMN to be removed, are used for purification of the 2,6-DMN in the above embodiments of this invention. As such organic solvent alcohols having 1–2 carbon atoms, hydrocarbons having 4 to 8 carbon atoms, such as butane, pentane, hexane, heptane, cyclopentane, cyclohexane, benzene, toluene and xylene, ketones such as acetone and methyl ethyl ketone, and ethers such as diethyl ether and diisopropyl ether can be exemplified. These organic solvents may be used singly, or admixtures of two or more of them can be employed.

The purification temperature may be suitably chosen depending on the kind of the purification solvent to be used, and it is preferred to select the temperature at which the solvent used has as low a dissolving property as possible for 2,6-DMN and exhibits as high a dissolving property as possible for the eutectic mixture of 2,7-DMN. Generally, temperatures ranging from —5° C. to 30° C. are adopted for the purification.

The isomerization reaction per se is well known in the art. Accordingly, a detailed description has been omitted although the isomerization is generally conducted in the following manner.

For instance, starting DMN isomers are contacted in the gas phase at a liquid space velocity of 0.2–10 v./v./hr. at 260–400° C. with a solid acid catalyst such as silica-alumina and zeolite, or they may be contacted in the liquid phase at —30 to 50° C. with a Friedel-Crafts catalyst such as boron trifluoride and aluminum chloride.

The operation conditions in the process of this invention will now be described in more detail.

The temperature at which the isomerization product is crystallized for separation in the crystallization zone is suitably selected depending on the composition of the isomerization product. In the above-mentioned first embodiment illustrated in FIG. 1, it is preferred that the isomerization reaction product is cooled at a temperature below the temperature at which the two-component eutectic mixture of 2,6-DMN and 2,7-DMN or the three-component mixture of 2,6-DMN, 1,5-DMN and 2,7-DMN is allowed to precipitate. The precipitating temperatures $T_2$ and $T_3$ of the two-component and three-component eutectic mixtures can be determined based on curves illustrated in FIGS. 3 and 4.

Figure 3:
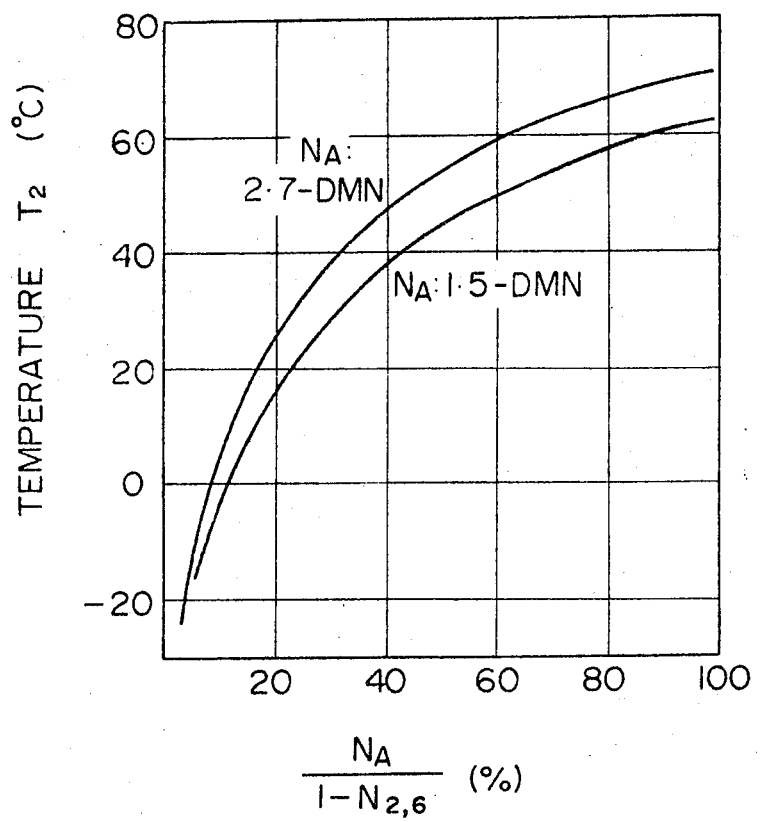
FIG. 3 illustrates the relation between the precipitating temperatures of the two-component eutectic mixtures of 2,6-DMN and 2,7-DMN and of 2,6-DMN and 1,5-DMN and the composition of the isomerization reaction product.

In FIG. 3 the value of $N_a/(1-N_{2,6})$ is graduated on the abscissa, wherein $N_a$ designates the mole ratio of 1,5-DMN or 2,7-DMN in the isomerization product and $N_{2,6}$ designates the mole ratio of 2,6-DMN in the isomerization product.

Figure 4:
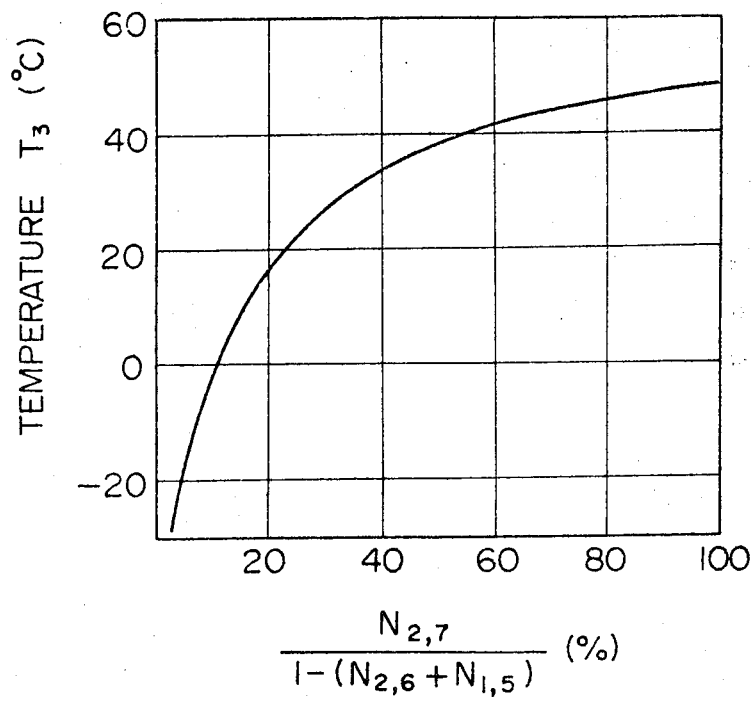
FIG. 4 illustrates the relation between the precipitation temperature of the three-component eutectic mixture of 2,6-DMN, 1,5-DMN and 2,7-DMN and the composition of the isomerization reaction product in the case where 2,7-DMN precipitates as the third component.

In FIG. 4 the value of $N_{2,7}/[1-(N_{2,6}+N_{1,5})]$ is graduated on the abscissa, wherein $N_{2,7}$, $N_{2,6}$ and $N_{1,5}$ designate mole ratios of 2,7-DMN, 2,6-DMN and 1,5-DMN in the isomerization product, respectively.

Examples of the precipitating temperatures $T_2$ and $T_3$ are shown in Table 1 below.

TABLE 1

| Sample number | DMN composition in isomerization product (mole percent) | | | | | $T_2$ (° C.) | $T_3$ (° C.) |
|---|---|---|---|---|---|---|---|
| | 2,6-DMN | 1,6-DMN | 1,5-DMN | 2,7-DMN | 1,7-DMN | | |
| 1 | 42.2 | 43.3 | 8.5 | 3.0 | 3.0 | 8 | —11.5 |
| 2 | 40.5 | 41.4 | 8.1 | 5.0 | 5.0 | —3 | —1 |
| 3 | 36.0 | 36.8 | 7.2 | 10.0 | 10.0 | 18 | |
| 4 | 31.5 | 32.2 | 6.3 | 15.0 | 15.0 | 27 | |
| 5 | 27.0 | 27.6 | 5.4 | 20.0 | 20.0 | 35 | |

In the case of isomerization product sample No. 1 in Table 1, since the content of 2,7-DMN is low and the content of 1,5-DMN is high, if the product is cooled below 8° C., a two-component eutectic mixture of 2,6-DMN and 1,5-DMN is precipitated, and if the cooling is effected below —11.5° C., 2,7-DMN is precipitated in the form of a three-component eutectic mixture with 2,6-DMN and 1,5-DMN. Accordingly, in this case, for the removal of 2,7-DMN it is necessary to cool the isomerization reaction product at a temperature lower than −11.5° C.

In isomerization product sample No. 2, if the cooling is effected below −1° C., a three-component eutectic mixture of 2,6-DMN, 1,5-DMN and 2,7-DMN is precipitated. Accordingly, for accomplishing the removal of 2,7-DMN it is sufficient to cool the isomerization reaction product at a temperature lower than −1° C.

In isomerization product samples Nos. 3 to 5, since the content of 2,7-DMN is higher, 2,7-DMN is allowed to precipitate at a temperature lower than $T_3$ in the form of a two-component eutectic mixture with 2,6-DMN.

In the above-mentioned first embodiment, the isomerization reaction product is cooled at a temperature below the precipitating temperature of 2,7-DMN, i.e., $T_2$ or $T_3$, which is determined depending on the composition of the isomerization product. Based on this cooling temperature the ratio of precipitated 2,7-DMN to 2,7-DMN remaining in the mother liquor to be recycled to the isomerization step is determined. It is preferred that the ratio is so chosen that the amount of 2,7-DMN removed from the recycle system is not smaller than the amount of 2,7-DMN formed in the isomerization step.

Figure 1:
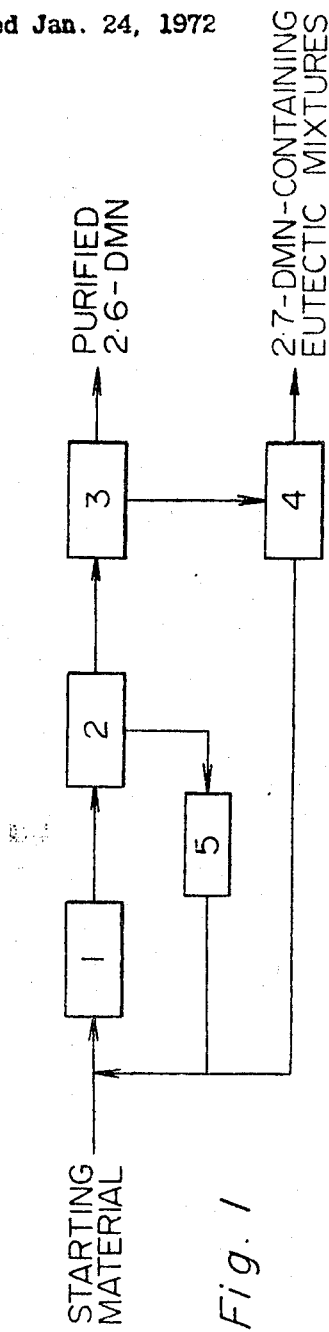
Figure 2:
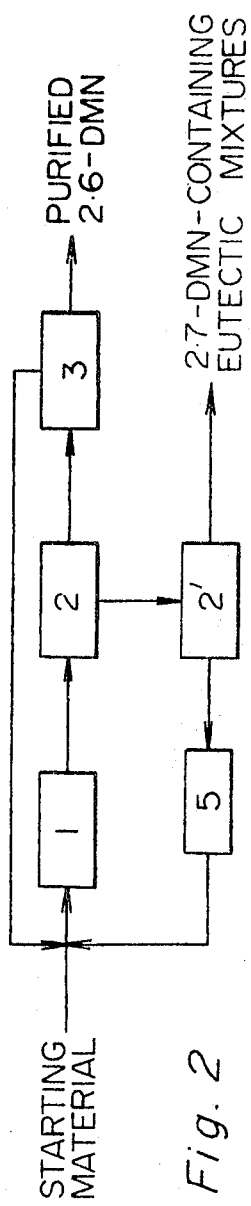

In the above-mentioned second embodiment of this invention illustrated in FIG. 2, the temperature is maintained at a level higher than the 2,7-DMN precipitating temperature $T_2$ or $T_3$ in crystallization zone 2. When the value of 1,5-DMN/2,7-DMN is greater than 1.38, namely when 1,5-DMN is allowed to precipitate in the form of the eutectic mixture, two procedures may be adopted. According to one procedure, the temperature is maintained above $T_2$ to precipitate 2,6-DMN, and according to the other procedure the temperature is maintained between $T_2$ and $T_3$ so as to precipitate the eutectic mixture of 2,6-DMN and 1,5-DMN as well as 2,6-DMN. Both procedures are illustrated more specifically in Examples 3 and 2 which will be given hereinbelow. To achieve the object of this invention, namely to remove the DMN eutectic mixture containing 2,7-DMN at a high concentration from the recycling isomerization reaction system at the second crystallization zone 2', the latter procedure is preferred.

Crystals of 2,6-DMN recovered from crystallization zone 2 contain usually the mother liquor to some extent, and therefore, it is difficult to obtain a mixture having the theoretcial composition. For instance, if the separation is conducted at a temperature exceeding $T_2$, theoretically the separated product should be pure 2,6-DMN. However, because of accompanying mother liquor, the 2,6-DMN actually separated has a purity of about 85 to about 95%. Accordingly, a purification step is required to obtain 2,6-DMN of a higher purity. When the separation is carried out at a temperature below $T_2$ or $T_3$, the crystallized product comprises 1,5-DMN, 2,7-DMN and the like in addition to 2,6-DMN. Accordingly, in such case a purification step should naturally be required to obtain 2,6-DMN of a high purity.

This purification is accomplished by washing or recrystallizing the crystallization product recovered from separation zone 2 with use of a solvent. In view of the object of this washing treatment, it is preferred that the treatment temperature is above the two component eutectic mixture-precipitating temperature $T_2$. It must be noted that in this case the temperature $T_2$ should be determined with respect to the entire system including the washing solvent.

In this invention, a DMN mixture containing 2,7-DMN at a high concentration is separated in zone 4 or 2'.

In the first embodiment, the mother liquor from which 2,6-DMN has been separated at the purification step, is cooled to a temperature below $T_2$ or $T_3$, to thereby precipitate a two component eutectic mixture of 2,6-DMN and 2,7-DMN or a three-component eutectic mixture of 2,6-DMN, 1,5-DMN and 2,7-DMN. It is also possible to accomplish the precipitation of the eutectic mixture by removing a part of the solvent or conducting this solvent-removing treatment in combination with the above cooling treatment.

Remaining DMN isomers are recovered from the above mother liquor and they may be recycled to the isomerization step directly or through the distillation step.

It is also possible to adopt a method comprising removing all the solvent from the mother liquor and separating the eutectic mixture from the remaining DMN mixture.

In the second embodiment, the mother liquor from which the mixture containing 2,6-DMN or the two-component eutectic mixture of 2,6-DMN and 1,5-DMN has been separated at the crystallization step, is cooled at a temperature below $T_2$ or $T_3$ to precipitate a 2,7-DMN-containing eutectic mixture, and it is separated from the mother liquor. The mother liquor from which the 2,7-DMN-containing eutectic mixture has been separated is forwarded to distillation zone 5 where low-boiling-point and high-boiling-point by-products are removed, and then the mother liquor is recycled to the isomerization step 2.

At each step explained hereinabove, the cooling is not limited to the one-step cooling. For instance, in order to facilitate the transportation of the slurry, it is possible to lower the temperature gradually up to $T_2$ by multi-staged cooling procedures.

At the first step of the process of this invention, namely the step of isomerizing DMN isomers, a solid acid catalyst such as silica-alumina, alumina-boria or zeolite is employed. When the isomerization is conducted with use of such acid catalyst, low-boiling-point by-products such as methyl naphthalenes and high-boiling-point by-products such as trimethyl naphthalenes are contained in the isomerization reaction product. The presence of such by-products results in lowering of the eutectic mixture-precipitating temperatures, $T_2$ and $T_3$. For instance, if the isomerization reaction product contains such by-products at a content of 5%, the operation temperature is lowered by more than 10° C. as compared with the case of the isomerization product free of such by-products. The lowering of the cooling temperature results in increase of expenses required for cooling and therefore, the presence of such by-products is not preferred from an economical viewpoint. Accordingly, when the isomerization reaction product contains such low-boiling-point and high-boiling-point by-products in considerable amounts, for instance, more than 5%, it is preferred to provide distillation zone 5 between zones 2 and 3 and to forward the isomerization reaction product to the crystallizing step after removal of such by-products.

Further, if these low-boiling-point and high-boiling-point by-products are recycled to the isomerization step, disproportionation or trans-alkylation of methyl naphthalenes and trimethyl naphthalenes is caused to occur, and as a result DMN isomers other than 2,6-DMN, 1,6-DMN and 1,5-DMN are formed in large amounts. Accordingly, it is preferred that major portions of low-boiling-point and high-boiling-point by-products formed at the isomerization reaction are removed and then the DMN fraction is recycled to the isomerization step.

As described above, in the process of this invention the isomerization reaction is carried out by employing 1,5-DMN and/or 1,6-DMN as the starting material, 2,6-DMN is separated and recovered from the isomerization reaction product, and a mixture containing 2,7-DMN in the form of a eutectic mixture is removed from the system prior to the recycle of the mother liquor to the isomerization step, whereby 2,6-DMN of high purity can be obtained at high efficiency and in excellent yield. Thus, this invention makes great industrial contributions to the art.

This invention will now be explained more specifically by referring to examples, where "parts" are "parts by weight" unless otherwise indicated.

EXAMPLE 1

A DMN mixture of a composition (I) indicated in Table 2 was isomerized at 290° C. at a liquid hourly space velocity of 3.0 with use of a silica-alumina catalyst which had been treated with steam under pressure. The composition of the resulting reaction product is also shown in Table 2.

100 parts of the above reaction product were cooled at 0° C. (lower by 5° C. than the three-component eutectic mixture-precipitating temperature of 5° C.), and precipitated crystals were separated to yield 39.4 parts of a DMN mixture having a composition shown in Table 2.

The so formed crystals were incorporated into 62 parts of methanol, agitated at 15° C. to effect washing, and separated from the methanol by filtration. As a result 29.3 parts of 2,6-DMN having a purity of 99.0% were obtained.

The methanol mother liquor used for washing was concentrated until its volume became ½ of the original volume, and precipitated crystals were separated therefrom. As a result 3.6 parts of a mixture having a high 2,7-DMN content, whose composition is shown in Table 2 were obtained. In order to prevent accumulation of 2,7-DMN at the isomerization reaction step, 3.6 parts of the mixture containing 2,7-DMN at a high content were removed from the system.

ing DMN mixture having the same composition as that of the starting DMN mixture (I) indicated in Table 2 were obtained. This starting mixture was isomerized under the same conditions as described above to yield a DMN mixture having the same composition as that of the isomerization product (II) indicated in Table 2.

When 3.6 parts of the mixture containing 2,7-DMN at a high content were not removed but recycled to the isomerization reaction step in the above example, the 2,7-DMN removed from the isomerization cycle is only 0.7 mole percent, based on the isomerization product, of 2,7-DMN contained in the recovered 2,6-DMN product. In order to prevent accumulation of 2,7-DMN in this isomerization system, it is necessary to reduce the ratio of 2,7-DMN formed at the isomerization step below 0.2 mole percent based on the isomerization product. If the isomerization is carried out under such conditions as will satisfy the above requirement, the isomerization degree is lowered and the cycling ratio is increased, with the result that the total yield is greatly lowered. However, when 3.6 parts of crystals (IV) obtained by concentrating the methanol mother liquor used for purification are removed from the isomerization cycle, even if 2,7-DMN is formed at the isomerization step in an amount of up to 1.8 mole percent based on the isomerization product, accumulation of 2,7-DMN can be prevented in the isomer-

TABLE 2

Compositions (mole percent)

| | Starting DMN mixture (I) | Isomerization product (II) | Crystals separated at 0° C. from isomerization product (III) | Crystals obtained by concentrating methanol mother liquor used for purification (IV) |
|---|---|---|---|---|
| 2,6-DMN | 4.5 | 35.3 | 81.0 | 50.6 |
| 1,6-DMN | 36.6 | 36.8 | 5.2 | 2.8 |
| 1,5-DMN | 44.8 | 8.0 | 3.8 | 1.9 |
| 2,7-DMN | 6.2 | 8.0 | 8.3 | 43.9 |
| 1,7-DMN | 7.7 | 7.7 | 1.1 | 0.5 |
| Low-boiling point and high-boiling point by-products | 0.2 | 4.2 | 0.6 | 0.3 |

When the methanol liquor from which 3.6 parts of crystals had been separated by filtration was distilled to remove methanol therefrom, 6.5 parts of a DMN mixture were obtained. Then the DMN mixture was combined with a DMN fraction obtained by distilling the mother liquor remaining after separation of the above crystals formed at 0° C. As a result 63.0 parts of a DMN mixture of the following composition were obtained:

| | Mole percent |
|---|---|
| 2,6-DMN | 7.1 |
| 1,6-DMN | 58.1 |
| 1,5-DMN | 12.5 |
| 2,7-DMN | 9.8 |
| 1,7-DMN | 12.2 |
| Low-boiling-point and high-boiling-point by-products | 0.3 |

In the above separation procedures, 29.5 parts of 2,6-DMN of 99.0% purity, 3.6 parts of the mixture containing 2,7-DMN at a high content and 4.1 parts of high-boiling-point and low-boiling-point by-products, totally 37.0 parts of these substances, were removed from the isomerization cycle. The amount corresponding to this amount removed, namely 37.0 parts, of 1,5-DMN was combined with the above mixture to be recycled to the isomerization reaction. As a result 100 parts of the startization cycle. Therefore, the yield of 2,6-DMN can be increased.

EXAMPLE 2

A DMN mixture having a composition (I) indicated in Table 3 was fed at a liquid hourly space velocity of 3.0 to a reaction tube packed with a H-type mordenite catalyst, and the isomerization was carried out at 290° C. to yield a reaction product having a composition indicated in Table 3.

100 parts of the so obtained isomerization product were cooled at 0° C. (lower by 7° C. than the two-component eutectic mixture-precipitating temperature of 7° C.) to precipitate crystals. As a result 44.0 parts of a DMN mixture having a composition III indicated in Table 3 were obtained. The crystals were incorporated into 80 parts of methanol, agitated at 15° C. to effect washing, and separated from the washing liquor by filtration. As a result 36.3 parts of 2,6-DMN of 99.0% purity were obtained.

The mother liquor from which crystals precipitated at 0° C. had been separated was cooled at −10° C. (lower by 3° C. than the three-component eutectic mixture-precipitating temperature of −7° C.) to precipitate 4.3 parts of 2,7-DMN-containing crystals having a composition indicated in Table 3. The crystals were removed from the isomerization cycle so as to prevent accumulation of 2,7-DMN at the isomerization step.

TABLE 3
Composition (mole percent)

| | Starting DMN mixture (I) | Isomerization product (II) | Crystals separated at 0° C. from isomerization product (III) | Crystals obtained by cooling mother liquor remaining after separation of (III) at −10° C. (IV) |
|---|---|---|---|---|
| 2,6-DMN | 4.2 | 41.4 | 86.7 | 26.4 |
| 1,6-DMN | 39.2 | 39.7 | 6.0 | 6.6 |
| 1,5-DMN | 50.0 | 8.6 | 5.8 | 47.2 |
| 2,7-DMN | 2.9 | 4.0 | 0.6 | 18.8 |
| 1,7-DMN | 3.7 | 3.8 | 0.5 | 0.6 |
| Low-boiling point and high boiling point by-products | 0.0 | 2.5 | 0.4 | 0.4 |

The mother liquor remaining after separation of crystals formed by cooling at −10° C. was combined with the washing liquor remaining after filtration of 2,6-DMN of 99.0% purity, and methanol was distilled therefrom, to thereby yield 56.5 parts of a DMN fraction having the following composition

| | Mole percent |
|---|---|
| 2,6-DMN | 7.5 |
| 1,6-DMN | 69.3 |
| 1,5-DMN | 11.4 |
| 2,7-DMN | 5.2 |
| 1,7-DMN | 6.6 |

When 1,5-DMN was incorporated into the above fraction in an amount corresponding to the amount of the substances removed from the system, namely 43.5 parts, 100 parts of the starting DMN mixture were obtained. The overall yield of 2,6-DMN attained in this example was 83.5%.

EXAMPLE 3

When 100 parts of the isomerization product obtained in Example 2 were cooled at 8° C. (higher by 1° C. than the two-component eutectic mixture-precipitating temperature of 7° C.), crystals were precipitated, and the precipitated crystals were separated to yield 40.6 parts of crystals having a composition indicated in Table 4. The crystals were washed with methanol to yield 36.6 parts of 2,6-DMN of 99.0% purity.

The mother liquor from which the crystals precipitated at 8° C. had been separated was then cooled to −10° C. to precipitate crystals. As a result 7.6 parts of 2,7-DMN-containing crystals having a composition (III) indicated in Table 4 were recovered.

TABLE 4
Composition (mole percent)

| | Isomerization product (I) | Crystals separated at 8° C. from isomerization product (II) | Crystals separated from mother liquor remaining after separation of (II) by cooling at −10° C. (III) |
|---|---|---|---|
| 2,6-DMN | 41.4 | 91.3 | 30.0 |
| 1,6-DMN | 39.7 | 6.1 | 6.6 |
| 1,5-DMN | 8.6 | 1.3 | 52.1 |
| 2,7-DMN | 4.0 | 0.6 | 10.4 |
| 1,7-DMN | 3.8 | 0.3 | 0.6 |
| Low-boiling point and high-boiling point by-products | 2.5 | 0.4 | 0.3 |

The mother liquor from which crystals precipitated at −10° C. had been separated was combined with the mother liquor remaining after separation of 2,6-DMN of 99.0% purity, and the washing solvent, i.e., methanol was removed from the mixed liquor. The residue was fractionated to yield 52.2 parts of a DMN fraction having the following composition:

| | Mole percent |
|---|---|
| 2,6-DMN | 5.4 |
| 1,6-DMN | 72.9 |
| 1,5-DMN | 8.8 |
| 2,7-DMN | 5.7 |
| 1,7-DMN | 7.2 |

This DMN fraction was blended with 47.8 parts of 1,5-DMN to yield 100 parts of a starting DMN mixture having the following composition:

| | Mole percent |
|---|---|
| 2,6-DMN | 2.8 |
| 1,6-DMN | 38.1 |
| 1,5-DMN | 52.3 |
| 2,7-DMN | 3.0 |
| 1,7-DMN | 3.8 |

What we claim is:

1. In the preparation of 2,6-dimethyl naphthalene by feeding 1,5-dimethyl naphthalene, 1,6-dimethyl naphthalene, a mixture thereof, or a mixture containing such dimethyl naphthalene as the main component to an isomerization reaction zone, isomerizing said dimethyl naphthalene in the presence of an isomerization catalyst, cooling the resulting isomerization reaction product to crystallize 2,6-dimethyl naphthalene, and separating and recovering the same, the improvement wherein an eutectic 2,7-dimethyl naphthalene mixture is removed at a stage after isomerization and before the mother liquor remaining after the recovery of 2,6-dimethyl naphthalene from the isomerization reaction product is recycled to the isomerization reaction zone, by cooling the mother liquor to or lower than a temperature at which the eutectic mixture of 2,7-dimethyl naphthalene crystallizes.

2. The process of claim 1, wherein mono- and trimethyl naphthalenes are distilled off at a stage before the mother liquor remaining after the recovery of 2,6-dimethyl naphthalene from the isomerization reaction product is recycled to the isomerization reaction zone.

3. The process of claim 1, wherein the removal of 2,7-dimethyl naphthalene or eutectic mixture thereof is effected by a combination of steps including cooling the isomerization reaction product at a temperature at which 2,6-dimethyl naphthalene is allowed to crystallize or at a temperature lower than said temperature but higher than the temperature at which 2,7-dimethyl naphthalene or eutectic mixture thereof is not allowed to precipitate, separating and recovering the crystallized 2,6-dimethyl naphthalene, cooling the remaining mother liquor at a temperature at which 2,7-dimethyl naphthalene or eutectic mixture thereof is allowed to crystallize or at a temperature lower than said temperature, and separating and removing the crystallized product.

4. The process of claim 3, wherein the separated crystalized 2,6-dimethyl naphthalene is treated with an organic solvent having a low dissolving property for 2,6-dimethyl naphthalene but having a high dissolving property for 2,7-dimethyl naphthaylene or eutectic mixture thereof, to thereby purify the 2,6-dimethyl naphthalene, and then the purified 2,6-dimethyl naphthalene is recovered.

5. The process of claim 4, wherein the purification solvent is removed from the mother liquor remaining after the recovery of the purified 2,6-dimethyl naphthalene, and the residue is recycled to the isomerization reaction zone.

References Cited

UNITED STATES PATENTS

| | | | |
|---|---|---|---|
| 3,109,036 | 10/1963 | Suld et al. | 260—668 A |
| 3,155,738 | 11/1964 | Suld | 260—668 F |
| 3,665,043 | 5/1972 | Davis et al. | 260—674 N |
| 3,541,175 | 11/1970 | Hedge | 260—674 N |
| 3,590,091 | 6/1971 | Skarada et al. | 260—674 N |

CURTIS R. DAVIS, Primary Examiner

U.S. Cl. X.R.

260—668 A, 674 N